May 21, 1963
G. M. RUOFF
3,090,912
INSULATOR TESTER
Filed March 24, 1959
3 Sheets-Sheet 1
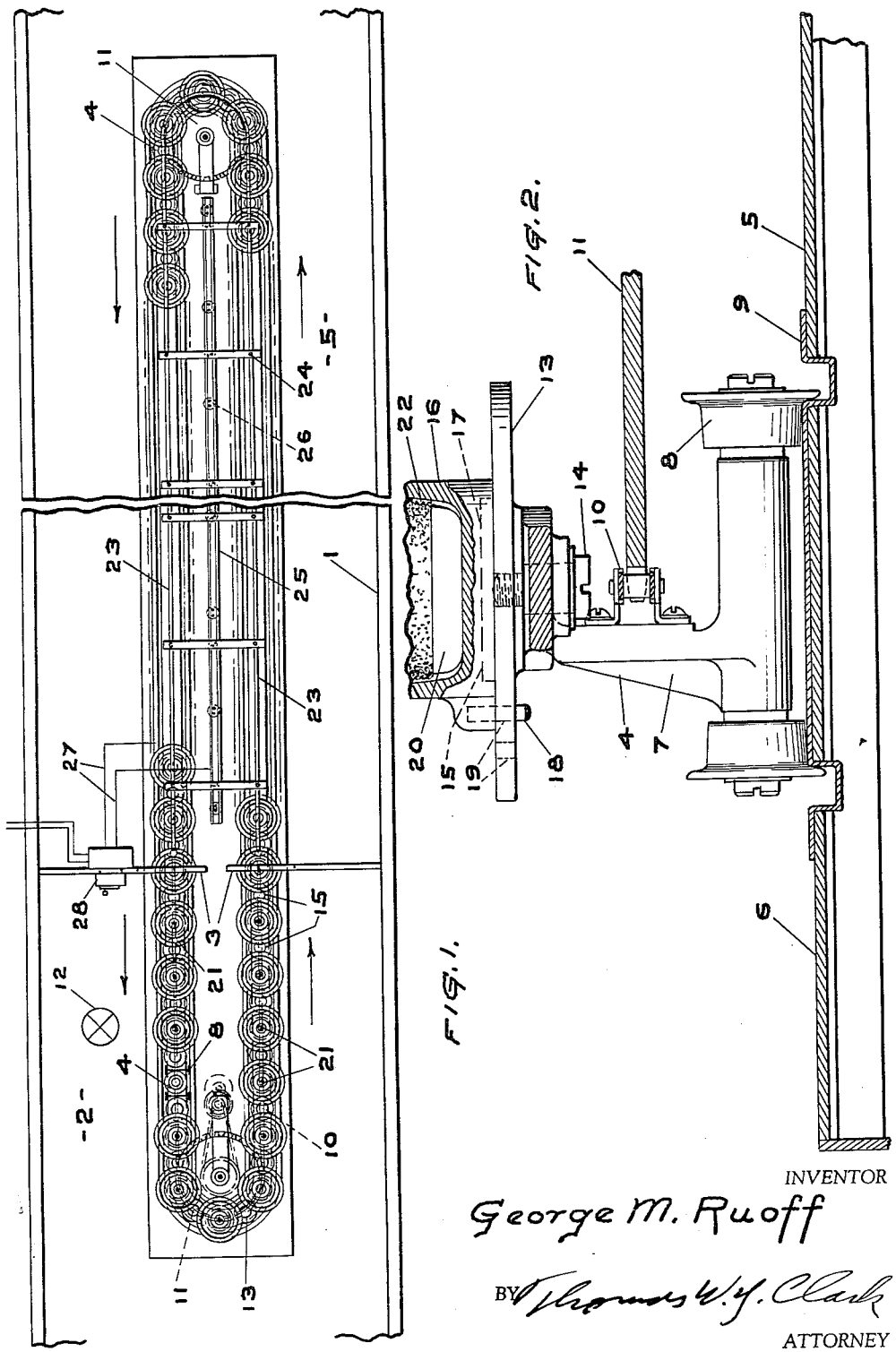
INVENTOR
George M. Ruoff
BY Thomas W. J. Clark
ATTORNEY

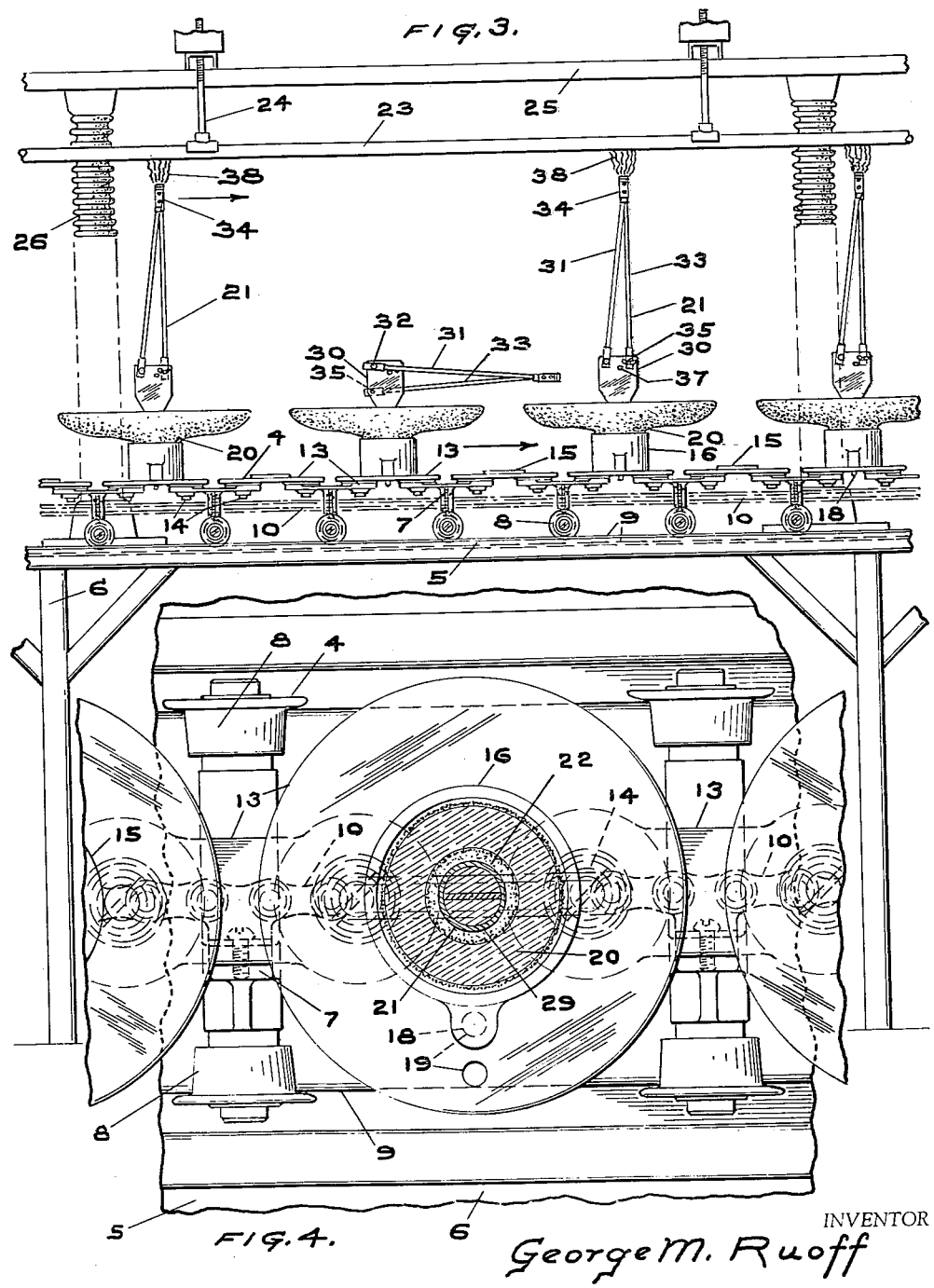

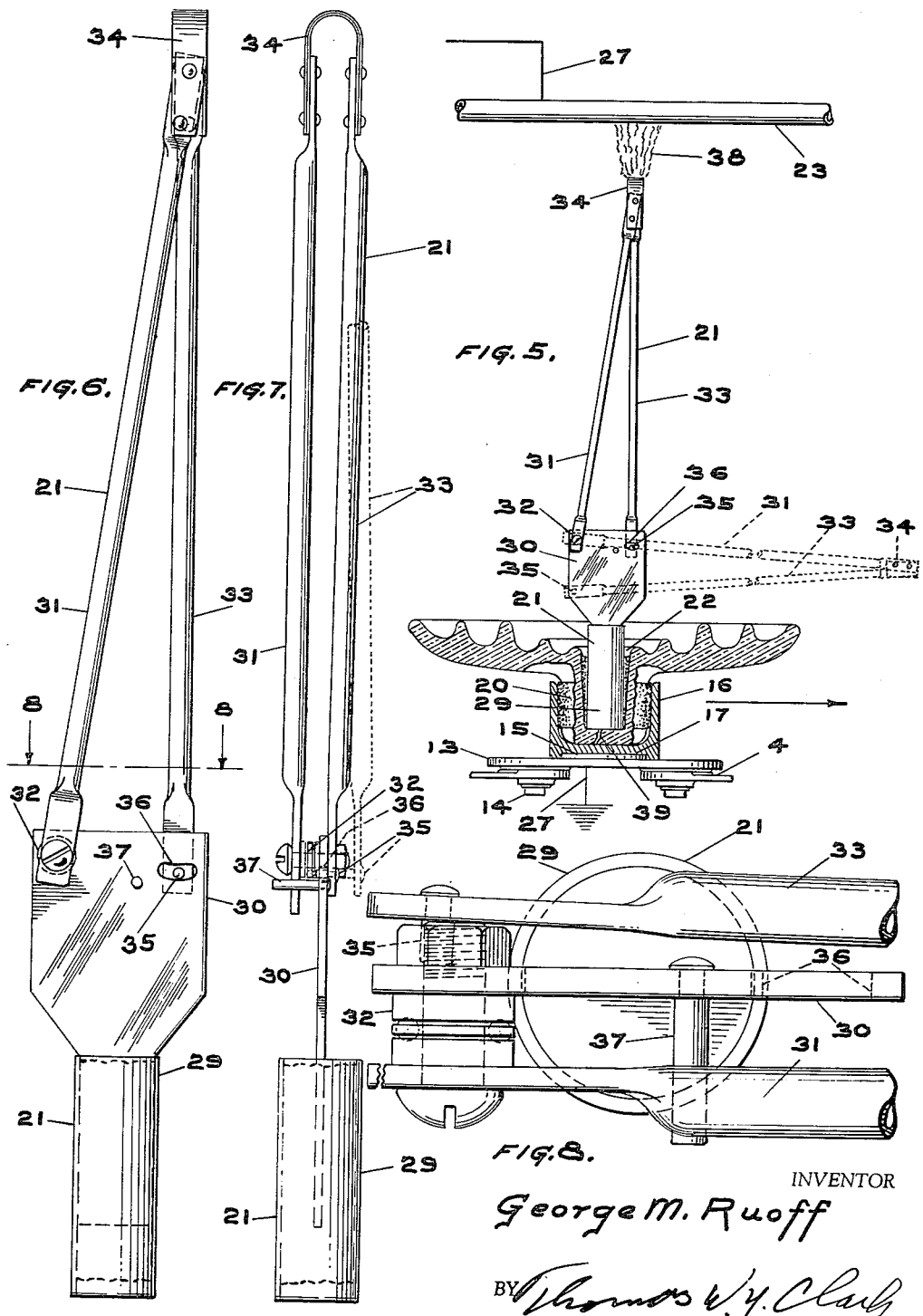

United States Patent Office 3,090,912
Patented May 21, 1963

3,090,912
INSULATOR TESTER
George M. Ruoff, Parkersburg, W. Va., assignor to A. B. Chance Company, Centralia, Mo., a corporation of Missouri
Filed Mar. 24, 1959, Ser. No. 801,496
8 Claims. (Cl. 324—54)

This invention relates to an apparatus for testing insulators for use in supporting high tension lines and in other locations where high tension current carrying means must be supported.

Porcelain insulators have been tested for a number of years before supporting hardware has been attached to them by placing them in inverted position individually on a conveyor which was grounded and placing an electrode in their center pin holes and the insulators on the conveyor were then passed around a platform with the upper ends of the electrodes adjacent a high tension bus bar so that high tension current passing through the upper electrodes in parallel to the ground would flash over or around the insulators but if an insulator should have or develop faults in the test, the current would short through the faulty insulator and the other insulators on the conveyor would then stop their flash-over because of the shorting of the current through the faulty insulator. When that occurred, it has been necessary for the operator to turn off the high tension current and remove the insulator from the conveyor before the test of the sound insulators could be continued. It has been the custom to test the insulators for a period of approximately five minutes under high voltage to assure that the porcelain insulators were sound before they were assembled with their hardware.

The high tension bus bars have usually been placed behind a guard to prevent access to them and the conveyor has gone through the guard so that it could be loaded outside the high tension portion of the room. The operator would normally stand and unload the tested insulators from the conveyor and load the untested insulators on the conveyor which would then pass through the guard for testing for the required time. Shutting off the high tension current and entering the space required to remove the faulty insulators from the conveyor greatly delays the running of the test and consumes too much of the operator's time.

One object of the present invention is to enable the operator to continue the test of sound insulators substantially uninterruptedly and permit the removal of the faulty insulator from the conveyor after it has passed from the testing area. Another object of the invention is the construction of an articulated electrode, to place in the pin hole of the insulators under test, which will bend or fall over and attenuate the current carrying arc from the bus bar to the point of breaking when the current is shorted through a faulty insulator. Another object of the invention is the removal of the faulty insulator from the test by the tipping of its supported electrode, and the restoration of the current through the other sound insulators for the continuance of the test. Should other insulators in the group develop faults under the impact of the passing current, they likewise will be removed from the test while the others are then caused to continue. After the removal of the faulty insulators from the line, after they have passed from the high tension portion of the conveyor room, the articulated electrodes may be reset and placed in new insulators on the conveyor as the conveyor again enters the high voltage section of the room.

Other objects and advantages of the invention will be apparent from the following description and the accompanying drawings forming a part hereof and in which:

FIGURE 1 is a top plan view of a conveyor equipped with the testing apparatus of the instant invention.

FIGURE 2 is a transverse fragmentary sectional view through one side of the continuous conveyor.

FIGURE 3 is a side elevational view of the conveyor during a test.

FIGURE 4 is an enlarged fragmentary plan view of the conveyor showing an insulator in section.

FIGURE 5 is an elevational view of an insulator shown in section under test.

FIGURE 6 is an elevational view of the new electrode of this invention.

FIGURE 7 is a similar view from the right of FIGURE 6.

FIGURE 8 is a top plan view substantially from line 8—8 of FIGURE 6, after the electrode has tipped over.

Similar numerals refer to similar parts throughout the several views. The testing room has a high tension portion 1 and a portion 2, the portions being separated by partition 3 which has a gate therein. An endless conveyor 4 is mounted on the top 5 of a stand 6 and the stand and conveyor extend through both sections 1 and 2 of the testing room and pass through partition 3. The conveyor 4 comprises supports 7 mounted on wheels 8 running on tracks 9 on the top 5 of the stand. The supports 7 are attached together by endless chain 10 which passes around sprockets 11 at each end of the conveyor, one of the sprockets being driven by a motor which may be turned on and off by the operator standing at position 12 in the outer portion 2 of the room. The conveyor supports 7 are connected together by links 13 which are supporting stands for the insulators under test. The link-forming parts of the supports 7 are connected to the stand link 13 by shouldered screws 14 as shown in FIGURE 2 to assure their firm connection without binding between the links. The platforms or stands 13 have raised centers 15 on which rest cups 16 having a recessed bottom 17 and a pin 18 passing through a centering hole 19 in the platforms or stands 13. The cups 16 may have different sized cups substituted for them for different sized insulators.

The top portion of the inverted insulator 20 is placed in the cups by the operator. An electrode 21 is then placed in the pin holes 22 of the insulators which support the electrode substantially vertically adjacent a bus bar 23 whose elevation may be adjusted by supporting screws 24 which are in turn supported on center member 25 supported near the center of the conveyor upon insulator posts 26 on the stand top 5. High tension current is connected to the center support 25 and the stand top 5 through lines 27 under the control of the operator at 28. The stand 6 and top 5 are grounded so that only the bus bars carry the high tension current.

The electrode 21 has a heavily weighted lower end 29 with a vertical plate 30 rigidly affixed therein and an inverted U-shaped upper end which has one arm 31 pivoted through a ball bearing pivot 32 to one corner of the plate 30. The electrode has another arm 33 hingedly attached to arm 31 by bimetallic strip 34 at the top. The lower end of arm 33 has a small pin 35 projecting from one face into a slot 36 in the plate 30 in the corner across from pivot 32, so that the upper end of the electrode is mounted off-center when the pin is released. The bimetallic strip is so bent as to lightly place the lower end of arm 33 against the back of plate 30 so that pin 35 in the slot 36 maintains the inverted U-shaped portion of the electrode vertical. Upon heating the bimetallic strip 34 it expands arm 33 as shown in dotted lines in FIGURE 7, so that the pin 35 is released from the slot 36 and the inverted U-shaped portion of the electrode tips over on its pivot 32 as shown in FIGURES 3 and 8 and in dotted lines in FIGURE 5. A stop 37 on plate 30 limits the extent of the tipping of the articulated portion of the electrode.

The operator standing at position 12 loads the conveyor which may be set in continuous operation from this position, the conveyor moving in the direction of the arrows as indicated in FIGURES 1, 3, and 5, carries the insulators with the electrodes supported therein into the test area adjacent the bus 23 where the current passes in arcs 38 to the electrodes 21 in parallel and it flashes around sound insulators to the conveyor and stand 6 which are grounded. If an insulator is weak electrically or if holes or cracks develope by the force of the sparks jumping from one electrode to the other, as through crack 39 in FIGURE 5, the current shorts through that particular insulator. Since the other insulators are in parallel and this short passes all the current, considerable heat is developed in the bimetallic strip 34, so that the arms 31 and 33 are spread apart and the electrode tilts over and stretches the arc 38. Should the arc be so strong as to continue even after the tipping of the electrode arms 31 and 33, the operator can see the action from his position and momentarily shut off the current and re-establish it and upon re-establishment around the sound insulators, the very long arc through the faulty insulator will not be re-established. The shorter arcs through the sound electrodes will rather be established and the test continue through its required time. When the punctured insulator with the tipping electrode emerges from the high tension part of the room, that insulator may be discarded and at the same time the electrode may be reset and placed in a new insulator for its entry into the high tension part of the testing room. The heat generated in the bimetallic strips by the arcs between them and the bus bars, in running the test through sound insulators, is so slight as not to expand the bimetallic strip. It is only when substantially all the current runs through a single short that enough heat is generated to heat the bimetallic strip to expand the arms of the electrode and cause the tipping of the arms.

It will be apparent that many changes may be made in the apparatus described without departing from the invention as set forth in the claims.

What is claimed as new and is desired to be secured by Letters Patent is:

1. In an apparatus for testing insulators having a lower insulator holding electrode, an upper elongated electrode substantially vertically and independent supportable at its lower end in an insulator, means adjacent the upper end of the upper electrode but spaced therefrom to pass a current therefrom through the upper electrode and flash over an insulator between the electrodes, the improvement comprising resettable means within the upper electrode to releasably maintain the same adjacent the current passing means but out of contact therewith to define an air gap therebetween of a dimension that is small enough to permit the passage of current between said current passing means and said electrode, and current responsive means to release said releasable means, to tilt the electrode and move it a greater distance from the current passing means to substantially increase the air gap therebetween to break the current at the upper end of the upper electrode upon a faulty insulator being present between the electrodes.

2. An apparatus for testing insulators comprising a lower insulator holding electrode, an upper elongated bendable electrode substantially vertically and independently supportable at its lower end in an insulator and means adjacent the upper end of the upper electrode but spaced therefrom to pass a current through the electrodes and flash over an insulator therebetween and resettable current increase responsive means to cause the bending of the upper electrode from the means passing the current thereto to further increase the spacing between said current passing means and said upper electrode to break the flow of current upon a faulty insulator being present between the electrodes.

3. In combination an elongated electrode vertically supportable at its lower end on an object to be tested and with its upper end adjacent a source of current, and a second electrode in contact with a remote portion of said object to be tested, said electrode having ground potential with respect to said elongated vertically supported electrode, said vertically supportable electrode further comprising a weighted lower end, an inverted U-shaped upper end, with both arms of the U-shaped upper end being flexibly joined at the top, means to pivot the lower end of one arm to the weighed lower end, and means to latch the lower end of the other arm to the weighted lower end, current responsive means to release the latching means upon the increased flow of current between said electrodes resulting from the electric failure of the object under test, said arms being pivoted off vertical center on the weighted lower end whereby the release of the latching means causes the tipping of the arms from the source of current.

4. An apparatus for testing a group of insulators having a common lower insulator holding electrode, a plurality of upper elongated articulated electrodes each substantially vertically supportable at its lower end in each insulator, means adjacent the upper ends of the upper electrodes to pass a current therefrom, through the upper insulator supported electrodes and flash over insulators between the upper and lower electrodes, the upper electrodes each having a lower section and an upper inverted U-shaped section of two arms flexibly connected together at the top, the lower end of one arm of the upper section of the electrodes being pivoted to the lower section of the electrode to support the upper section off vertical center, the lower end of the other arm being latched to the lower section of the electrode, said U-shaped section comprising bimetallic current responsive means to release the latch to tilt the arms from the current passing means upon the increased current flow between an upper electrode and the common lower electrode which results from the failure of an insulator therebetween.

5. A system for simultaneously electrically testing a multiplicity of insulators comprising a high potential source of electrical energy conveyed by a fixed bus and a plurality of movable electrodes in parallel each of which is adapted to be affixed adjacent the surface of an insulator to be tested, means providing a second electrode adjacent the opposite surface of each insulator, moving means to transport insulators with said first electrodes affixed along the path of said bus but spaced therefrom, said plurality of electrodes each being located sufficiently close to said source of electrical energy to provide a flow of electricity between said plurality of electrodes, around the sound insulators disposed therebetween, and to said means providing a second electrode, separate retracting means for each of said plurality of electrodes operative to substantially displace an electrode from said source of high potential when a defective insulator adjacent the electrode to be displaced fails and permits the electrical path between that electrode and the means providing a second electrode to be shorted through the insulator, thereby visually indicating defective insulators and permitting their withdrawal from electrical test without substantially interrupting the testing of sound insulators.

6. A method of testing insulators without interruption comprising
(1) placing each insulator to be tested on a continuous, moving horizontally disposed belt having first electrode means movable with said belt adjacent the lower surface of each insulator,
(2) supporting the lower end of an elongated second electrode adjacent the upper surface of each insulator on said belt,
(3) transporting each insulator by said moving belt along the path of an extended fixed high potential conductor with the upper end of said elongated second electrode retractably positioned in close enough proximity to said fixed high potential conductor to create an electrical discharge between said first and said second electrodes, said discharge lying along a path of high resistance on the exterior of a sound insulator being tested but along a path of comparatively low resistance passing through a defective insulator being tested, whereby the current flowing is considerably increased through the low resistance path, (4) passing said increased current flowing through a defective insulator through a current responsive device producing retraction of said second electrode in response to said increased current, and (5) without stopping the motion of said continuous belt and without interrupting the testing of sound insulators, removing defective insulators and insulators and sound insulators that have completed the test cycle and replacing them with additional insulators to be subjected to the same test cycle.

7. Apparatus for testing the dielectric strength of an insulator comprising: a pair of spaced conductors; an electrode between the conductors; means maintaining a potential difference between said conductors while an insulator to be tested is interposed between the electrode and one of the conductors, said electrode having a movable element and a releasable device holding the element against movement; and a member connected with said device for releasing the latter, said member being responsive to current flowing through the electrode when the dielectric of said insulator fails to block flow of current therethrough, whereby the device is released by the member, and the element moves away from the other conductor to a position breaking the current flow between the conductors, said member being resilient and flexing in response to the heat of a predetermined value of current, and means connecting the member with the device for shifting the latter in response to flexing of the member.

8. Apparatus for testing the dielectric strength of an insulator comprising: a pair of spaced conductors; an electrode between the conductors; means maintaining a potential difference between said conductors while an insulator to be tested is interposed between the electrode and one of the conductors, said electrode having a movable element and a releasable device holding the element against movement; and a member connected with said device for releasing the latter, said member being responsive to current flowing through the electrode when the dielectric of said insulator fails to block flow of current therethrough, whereby the device is released by the member, and the element moves away from the other conductor to a position breaking the current flow between the conductors, the electrode having a support swingably mounting said element, the device being normally connected with the support and coupled with said element through the member, said element, member and device swinging as a unit with respect to the support when the device is released.

References Cited in the file of this patent
UNITED STATES PATENTS

| | | |
|---|---|---|
| 975,431 | Jackson | Nov. 15, 1910 |
| 1,750,699 | Austin | Mar. 18, 1930 |
| 2,273,764 | Salter | Feb. 17, 1942 |
| 2,412,483 | Warrington | Dec. 10, 1946 |
| 2,484,839 | Lindell | Oct. 18, 1949 |
| 2,493,347 | Hill | Jan. 3, 1950 |
| 2,502,179 | Smith | Mar. 28, 1950 |
| 2,532,336 | Rufolo | Dec. 5, 1950 |
| 2,662,137 | Smith | Dec. 8, 1953 |